Patented Apr. 30, 1929.

1,711,009

UNITED STATES PATENT OFFICE.

WILHELM BAUER AND ALFRED HERRE, OF OPLADEN, NEAR COLOGNE, AND ALBERT FUNKE, OF HOCHST-ON-THE-MAIN, GERMANY, ASSIGNORS TO GRASSELLI DYE-STUFF CORPORATION, OF NEW YORK, N. Y., A CORPORATION OF DELAWARE.

READILY-SOLUBLE VAT COLOR PREPARATIONS.

No Drawing. Original application filed November 29, 1924, Serial No. 752,936, and in Germany December 10, 1923. Divided and this application filed May 17, 1926. Serial No. 109,796.

We have invented certain new and useful improvements in readily soluble vat color preparations.

This invention relates to the production of vat color preparations which dissolve readily in water with simultaneous formation of the leuco compounds, and to vat color preparations which may be made readily soluble by the addition of alkali. The solid, dry vat color preparations also form part of the present invention.

The constant increase of the use of the vat colors for dyeing exceedingly fast shades on vegetable or animal fibers is somewhat hampered by complications in the method of applying these colors to the fiber. The dyestuffs have to be brought into a soluble form by treating same in aqueous suspension with a reducing agent at sometimes high temperature, whereas the preparations which form the subject of this invention are readily soluble in cold or, at the most, in lukewarm water and can be used as easily as direct cotton colors.

We have found if water insoluble vat colors are treated with a dispersing agent, the dyestuffs are transformed into a comminuted form, which allows them to react instantaneously with the reducing agent in presence of cold water to form the easily soluble leuco compounds. Among the compounds which display such a dispersing action, we have found that easily soluble carbohydrates which might also have a reducing effect, such as glucose, dextrine, etc., can be used. The un-vatted dyestuff is treated with easily soluble carbohydrates together with caustic alkalies and hydrosulphite. The best method of procedure is to evaporate the wet dyestuff paste with the above mentioned carbohydrates and mix the material so obtained with alkali and hydrosulphite. The preparations are stable and on introduction into warm water yield a vat which is immediately ready for use.

The preparations of this invention may also be prepared without the use of alkali. The dyestuff paste is mixed with the carbohydrate, evaporated and then hydrosulphite is added. The preparations obtained in this manner are likewise very stable. It is only necessary when the paste is to be used for dyeing, to add alkali.

The following specific examples will further illustrate the invention but it is to be understood that the invention is not limited to the vat colors mentioned, nor to the specific dispersing or reducing agents used.

1. 10 parts by weight of the dyestuff described in U. S. Patent 1,074,405 are mixed as a wet paste with 5 parts by weight of glucose and evaporated to dryness. The mixture so obtained is ground with 11 parts by weight of sodium hydrosulphite powder and 6.5 parts by weight of caustic soda under exclusion of air. The resulting preparation is stable and yields on introduction into warm water a vat which is immediately ready for use.

2. 10 parts by weight of the dyestuff described in U. S. Patent 1,074,405 are mixed as a wet paste with 5 parts by weight of glucose and evaporated to dryness. The mixture so obtained is ground with 11 parts by weight of sodium hydrosulphite powder under exclusion of air. The resulting preparation is likewise very stable. When it is desired to use the paste for dyeing, it is only necessary to add alkali.

This application is a division of our parent application Serial No. 752,936, filed November 29, 1924.

We claim:

1. As a new product, a dry readily soluble vat color preparation comprising a dispersed insoluble vat dyestuff, an easily soluble carbohydrate and a reducing agent.

2. As a new product, a dry readily soluble vat color preparation comprising a dispersed insoluble vat dyestuff, glucose, and a reducing agent.

3. As a new product, a dry vat color preparation comprising a dispersed insoluble vat dyestuff, an easily soluble carbohydrate, and a hydrosulphite.

4. As a new product, a dry vat color preparation comprising a dispersed insoluble vat dyestuff, glucose, and a hydrosulphite.

5. As a new product, a dry readily soluble vat color preparation comprising a dispersed insoluble vat dyestuff, an easily soluble carbohydrate, a hydrosulphite and an alkali.

6. As a new product, a dry readily soluble vat color preparation comprising a dispersed insoluble vat dyestuff, glucose, a hydrosulphite, and an alkali.

7. The process of producing dry readily soluble vat color preparations which comprises preparing a mixture of the insoluble vat colors with an easily soluble carbohydrate having a reducing action and water, drying the mixture and mixing a reducing agent therewith.

8. The process of producing dry readily soluble vat color preparations which comprises preparing a mixture of the insoluble vat colors with glucose and water, drying the mixture and mixing a reducing agent therewith.

9. The process of producing dry readily soluble vat color preparations which comprises preparing a mixture of the insoluble vat colors with glucose and water, drying the mixture and mixing a hydrosulphite therewith.

10. The process of producing dry readily soluble vat color preparations which comprises adding glucose to a wet paste of the insoluble vat colors, drying the mixture and mixing a hydrosulphite and an alkali therewith.

In testimony whereof, we affix our signatures.

WILHELM BAUER.
ALFRED HERRE.
ALBERT FUNKE.